Apr. 17, 1923. 1,452,135
O. L. ADAMS
LOAD SUPPORTING CONNECTION FOR WHEELED STRUCTURES
Filed Nov. 21, 1921
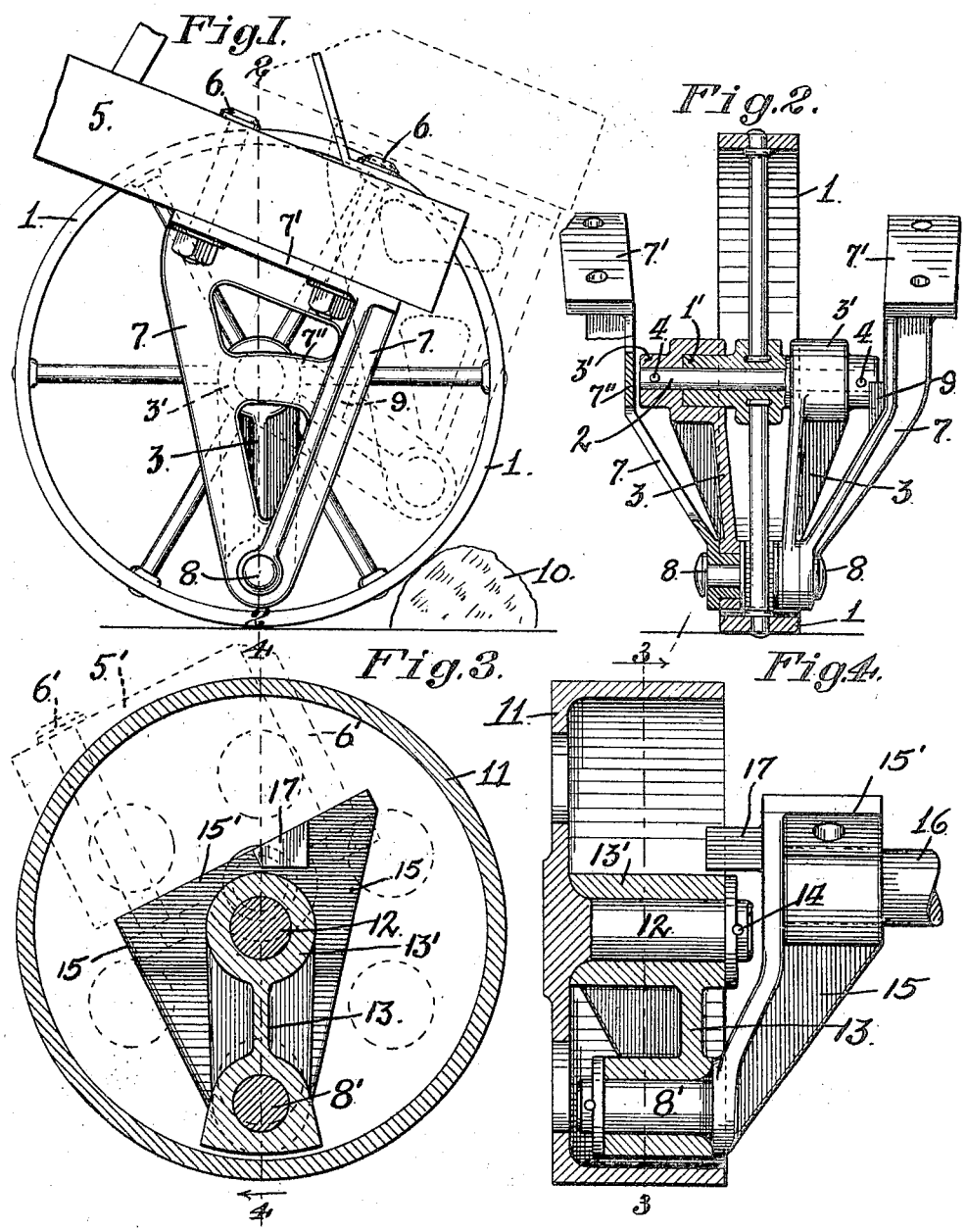
Inventor,
Ora L. Adams
By Booth & Booth
attorneys Patented Apr. 17, 1923.

1,452,135

UNITED STATES PATENT OFFICE.

ORA L. ADAMS, OF BERKELEY, CALIFORNIA.

LOAD-SUPPORTING CONNECTION FOR WHEELED STRUCTURES.

Application filed November 21, 1921. Serial No. 516,601.

*To all whom it may concern:*

Be it known that I, ORA L. ADAMS, a citizen of the United States, residing at Berkeley, in the county of Alameda and State of California, have invented certain new and useful Improvements in Load-Supporting Connections for Wheeled Structures, of which the following is a specification.

My invention relates, in general, to the means for supporting the load in connection with wheeled-structures, and, in particular, to the adaptation of such means to wheelbarrows, push-carts, hand-trucks and other like structures.

The chief object of my invention is to adapt such structures, with their relatively small wheels and limited propelling force, to more easily surmount obstructions. Other objects are to simplify the construction, lighten and strengthen the connections and safely increase the carrying capacity, all consistently with the main object intended and with the propelling force available.

With these objects in view my invention consists in the novel load-supporting connections which I shall now fully describe, by reference to the accompanying drawings in which—

Fig. 1 is a side elevation of my connections showing their application to the single wheel of a wheel-barrow.

Fig. 2 is a section partly in elevation on the line 2—2 of Fig. 1.

Fig. 3 is a vertical section on the line 3—3 of Fig. 4, showing my connections as applied to one of the wheels of a hand-truck.

Fig. 4 is a section on the line 4—4 of Fig. 3.

In Figs. 1 and 2, the numeral 1 indicates the single wheel of a wheelbarrow. 2 is an axle upon which the hub 1' of the wheel freely rotates. 3 are links, the heads 3' of which are pinned fast at 4 to the axle near its ends, as shown in Fig. 2, said heads freely and rotatively overlapping the ends of the wheel hub 1'. The links 3 depend from the axle and in their best form, in order to obtain maximum leverage, they extend down nearly to and lie within the wheel rim, though without contact therewith.

5, in Fig. 1, are the sills of the body frame of the barrow, the body itself needing no illustration herein, as it may be of any suitable type. The sills 5, in this case may be considered as extended rearwardly to form the handles of the wheel barrow.

The forward ends of the sill or handle frames 5 are bolted at 6, Fig. 1, to the flanged tops 7' of hangers 7, which extend down by the ends of the axle, though, as shown in Fig. 2, clear thereof, and are pivoted at their lower ends at 8, to the lower ends of the links 3.

The hangers 7 are, in their best form, of open, triangular shape with a cross member 7'', which lies opposite the ends of the axle, and which will serve as stops to limit the tilting of the wheel and axle if the joints of the several connections wear loose.

One of the hangers carries a stop lug 9, which by contact with the end of the head of one of the links serves to limit the backward or return swing of said hangers.

In Fig. 1, is shown at 10 an obstruction in the path of the wheel 1.

The normal position of the parts under the weight of the load is as shown. But when the wheel meets the obstruction 10, the momentum inertia of the load will cause the hangers to swing the links 3 forwardly and upwardly, thereby lifting said hangers and the load with the axle 2 as a center, in an uprising arc, as shown by the dotted lines in Fig. 1, to a position above the obstruction and thus enable the wheel to more readily surmount and pass over said obstruction. In this movement the stop 9 of the hanger does not function, since by the swing of the hanger about its pivot at 8, said stop moves away from the head of the link; but when the wheel has surmounted the obstruction and the forward momentum which caused the elevation of the load is expended, the momentary backward resistance of the operator on the handles 5 causes the return of all parts to normal position in which a limit is found by the stop 9 contacting with the head of the link.

This effect is of benefit in several ways; as, for example, it is easier for the workman; it tends to reduce the jar of impact against the obstruction; and it carries the load with greater safety, a result particularly to be desired in the wheeling of concrete and like spillable loads, where the path of travel is usually strewn with obstructing particles and objects of all sizes.

In Figs. 3 and 4, I show my connections applied to a hand-truck. The differences lie in arrangement of parts to better fit them to the concavity of the ordinary hand-truck wheel. But one wheel is shown in these figures. The wheel 11 has an integral axis 12 upon which the link 13 is rotatable, its head 13' being held on the axis by a pin 14. The frame supporting hanger 15 is carried pivotally upon a cross rod 16 of the truck-frame, and is provided with a stop lug 17 extending into the flanged inclosed area of the wheel and adapted by its eccentricity of movement to contact with the head 13' of the link 13, and limit the swing of the link.

The frame sills are indicated by 5', the securing bolts by 6', the tops of the hangers by 15' and the pivotal connections between the links and hangers by 8'.

I claim:

1. In a wheeled-vehicle and in combination with its wheel and body frame, a load-carrying connection comprising an axle for the wheel; a swinging link depending from said axle; a hanger carrying at its upper end the body-frame and at its lower end pivotally connected with the lower end of the link, and a stop on said hanger coacting with the head of the link to limit the return movement of the hanger.

2. In a wheeled-vehicle, and in combination with its wheel and body-frame, a connection comprising an axle freely rotatable in the hub of the wheel; a link fast upon and depending from said axle; a hanger carrying at its upper end the body-frame and at its lower end pivotally connected with the lower end of the link, and a stop on said hanger coacting with the head of the link to limit the return movement of the hanger.

3. In a wheeled-vehicle, and in combination with its wheel and body frame, a connection comprising an axle for the wheel; a swinging link depending from said axle; and a hanger carrying at its upper end the body-frame and at its lower end pivotally connected with the lower end of the link, said hanger passing by and clear of the end of the axle and forming a stop therefor against tilting of said axle and wheel.

4. In a wheeled vehicle, and in combination with its wheel and body frame, a connection comprising an axle freely rotatable in the hub of the wheel; a link having a head fast on the end of the axle and rotatively overlapping the end of the wheel hub, said link depending radially from the axle to the vicinity of and free from the wheel rim; and a hanger carrying at its upper end the body-frame and at its lower end pivotally connected with the lower end of the link.

In testimony whereof I have signed my name to this specification.

ORA L. ADAMS.